Figure 1:
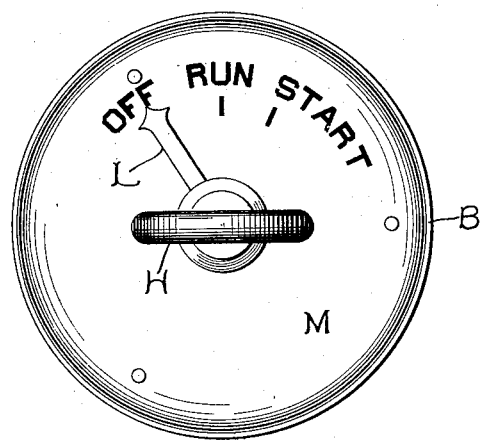

No. 735,077. PATENTED AUG. 4, 1903.
A. R. EVEREST.
STARTING SWITCH FOR ELECTRIC MOTORS.
APPLICATION FILED MAY 22, 1902.
NO MODEL. 2 SHEETS—SHEET 1.

Witnesses:
George A. Thornton.
Helen Oxford

Inventor:
Augustine R. Everest.
by Albert G. Davis
Att'y.

No. 735,077. PATENTED AUG. 4, 1903.
A. R. EVEREST.
STARTING SWITCH FOR ELECTRIC MOTORS.
APPLICATION FILED MAY 22, 1902.
NO MODEL. 2 SHEETS—SHEET 2.

Witnesses.
George H. Tilden
Helen Orford

Inventor.
Augustine R. Everest
By Albert G. Davis
Att'y.

No. 735,077. Patented August 4, 1903.

UNITED STATES PATENT OFFICE.

AUGUSTINE R. EVEREST, OF LYNN, MASSACHUSETTS, ASSIGNOR TO GENERAL ELECTRIC COMPANY, A CORPORATION OF NEW YORK.

STARTING-SWITCH FOR ELECTRIC MOTORS.

SPECIFICATION forming part of Letters Patent No. 735,077, dated August 4, 1903.

Application filed May 22, 1902. Serial No. 108,477. (No model.)

*To all whom it may concern:*

Be it known that I, AUGUSTINE R. EVEREST, a subject of the King of Great Britain, residing at Lynn, county of Essex, State of Massachusetts, have invented certain new and useful Improvements in Starting-Switches for Electric Motors, of which the following is a specification.

My invention relates to starting-switches or controllers for electric motors, and is more particularly designed for single-phase induction-motors employing a starting-winding which is intended to be be cut out of circuit as soon as the motor is running. It has for its main object to prevent the starting connections from being maintained unintentionally after the operator has moved the switch to start the motor.

A further object of my invention is to so organize a motor-switch having "starting" and "running" positions that the switch upon being moved into its starting position and then released will be automatically moved into the running position.

My invention also comprises further novel features of construction, which will be hereinafter described and claimed.

It is well known that single-phase induction-motors will not start from rest. It is therefore usual to provide, in addition to the main single-phase winding, a starting-winding in which the current phase is caused to differ from that in the main winding by any well-known means. The construction and operation of such motors is well understood in the art. The starting-winding is intended to be used only in starting the motor, and is composed of wire of much smaller size than would be required if it were designed to carry current for longer periods. It is therefore necessary that there should be no mistake about its being cut out of circuit when the motor attains full speed; otherwise the motor will operate inefficiently and the starting-winding may overheat and burn out. The starting-switch which I have devised may be used to prevent careless or inexperienced persons from neglecting to cut out this starting-winding, and in this capacity it will be found of great service. I have therefore chosen to illustrate my invention in connection with a single-phase motor of the character described.

Figure 2:
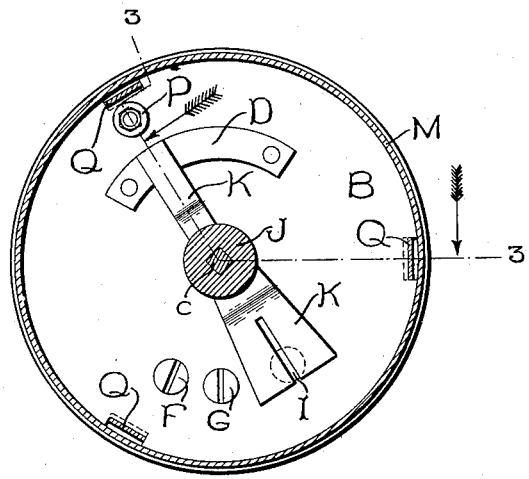
Figure 3:
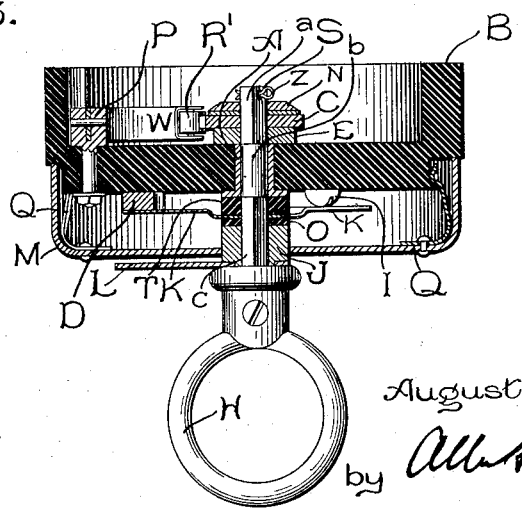
Figure 4:
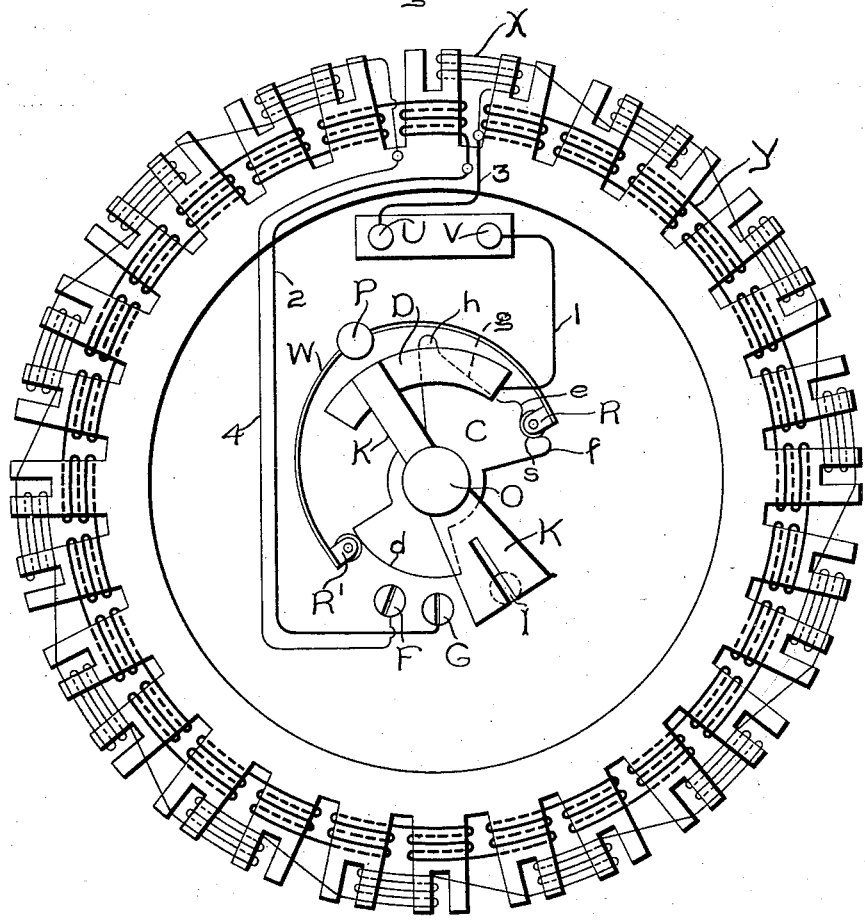
Figure 5:
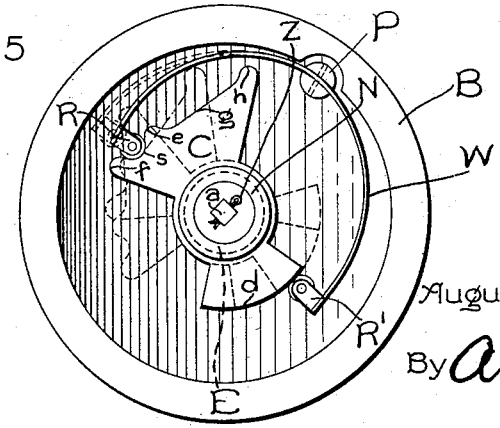

In the accompanying drawings, Figure 1 is a top plan view of a switch embodying my invention with the cover on. Fig. 2 is a top plan view of the switch with the top of the cover removed. Fig. 3 is a section on broken line 3 3 of Fig. 2 viewed as indicated by the arrow. Fig. 4 is a diagram of motor-windings with my invention applied thereto. Fig. 5 is a bottom plan view of the switch.

Referring now to the drawings, B is a standard or base, of porcelain or other suitable insulating material, in the center of which is a hole fitted with a bushing or box A in such a manner as to form a suitable bearing for shaft S. The bearing portion $b$ of the shaft is of circular cross-section, but exterior to the bearing it has at each end a square section $a$ and $c$. Secured to shaft S at one end is cam C, which is prevented from movement with reference to the shaft by the coöperation of the square section $a$ of the shaft and a square hole in the cam into which the shaft enters. This cam C is of peculiar construction, terminating at one end in arc $d$, the center of which lies in the axis of the shaft, and at the other end in an irregular surface composed of notch $s$, between two projections $e$ and $f$ and the plane surface $g$, included between the projections $e$ and $h$. Cam C is maintained at a proper distance from base B by means of washer E, which abuts against the shoulder on shaft S, formed at the junction of the round or bearing portion $b$ and the square portion $a$, exterior to the bearing, and is secured upon the shaft by pin Z, which bears against washer N, interposed between the pin and cam. Upon the opposite side of base B a contact-arm K is secured to shaft S, with which it coöperates, in the same manner as was observed in securing cam C to the shaft. Washer T maintains this arm at a suitable distance from bearing A and abuts against a shoulder upon the shaft similar to that described in connection with the washer E. Upon the outside of arm K is a similar washer O, and upon this is placed a sleeve J, which extends through cover M. Against this sleeve and upon the outside of cover M is placed pointer L. Handle H is then secured on the shaft and against pointer L, so that a firm construction is obtained. Attached to the porcelain base by any well-known means is a segmental contact D and the contacts F, G, and I, which in this case are represented as screwheads. To one side of cam C and secured to base B is post P, carrying a curved band-spring W, which is let into a slot in the post and secured therein in any approved manner. Spring W carries at its extremities the members R and R', which bear upon diametrically opposite points of cam C. This construction is designed to relieve the pressure on the bearing, thus contributing to the easy working of the switch, and possesses the merits of being efficient, simple, and inexpensive. The cover M is secured to base B by means of spring-clips Q, which are secured in any suitable manner to the interior of cover M and are adapted to engage with recesses in base B to secure the base and cover firmly together. This permits the cover to be made of any desired form, which is not the case when the engagement of the cover with other portions of the switch is relied on to hold it in place, and the clips themselves are concealed.

Upon the exterior of the cover are marked the positions of "Off," "Run," and "Start," these positions of the controller being indicated by the pointer L, which is secured to and moves with shaft S. The sequence of positions, as indicated, will be found of peculiar service because of the tendency of inexperienced operators to continue turning the switch until the motor starts. This tendency with the switch I have invented will lead such operators to turn the switch into the starting position, from which it is automatically moved to the running position, and thus reduce the danger of too hurriedly passing over the starting position, which might easily happen if the starting position were placed between the off and running positions, as is the usual practice in motor-controlling switches.

Referring now to Fig. 4, the supply-mains may be considered to be connected to the terminals U and V. X represents the starting-winding of the motor, while Y represents the main coil-winding, the difference in current phase being produced in this case by the difference in reactance of the windings, X being wound for the greater reactance.

The operation of the switch is as follows: In the drawings the controller is shown in the off position. The contact-arm K rests upon the dead contact I, and consequently all circuits to the motor are open, the member R in this position resting in notch s. In order to start the motor, it is necessary that the contact-arm K, and with it the cam C, be turned so that roller R will travel to the farther extremity of plane surface g. This is the starting position and is shown in Fig. 5 by the dotted lines, which indicate an extreme position of cam C. The contact-arm K in this position is in contact with the segmental contact D and also with contacts F and G. Circuits can therefore be traced from terminal V through conductor 1 and contact D to contact-arm K. Here the current divides, a part passing by means of contact G through the main coil, the remainder passing by means of contact F through the starting-winding. From contact G circuit may be traced through conductor 2 to main winding Y and conductor 3 to terminal U. From contact F circuit may be traced through conductor 4, starting-winding X, and conductor 3 to terminal U. In this position of the controller spring W is distended, as indicated by the dotted lines in Fig. 5, and the spring tending to force member R toward the center of the shaft produces a turning movement on shaft S, which operates to turn it in a direction such that member R will travel to the opposite end of plane surface g, when it will rest against projection e. This is the running position, and is shown in Fig. 5 by the dotted lines indicating the intermediate position. It will be noted that the tendency of the spring to move the cam, and with it the contact-arm, into the last-mentioned position will cause the contact-arm to occupy this position at once when moved from the off position unless it is restrained from doing so by the hand of the operator, it being necessary with the apparatus shown for the operator to hold the switch in the extreme position until the motor shall have acquired approximately full speed. This may, however, be accomplished automatically by the application to the movable member of the switch of any of the well-known retarding devices—as, for instance, a dash-pot. In this last position of the switch contact-arm K, while still in contact with contact D, has been removed from connection with contact F. Circuit through contact G is, however, still maintained, thus leaving the main coil alone in circuit with the source of supply. It will now be seen that the starting-winding remains in circuit only so long as it is retained there by the hand of the operator or a device substituted therefor, and upon the removal of the restraining means the switch immediately assumes the running position, where this coil is cut out of circuit.

The switch which I have devised may have a variety of applications, and certain of the features of construction may be embodied in a variety of structures. I therefore desire it to be understood that my invention is not limited to the application or embodiment shown in the drawings.

What I claim as new, and desire to secure by Letters Patent of the United States, is—

1. The combination with the main and starting windings of an induction-motor, of a switch having a movable member adapted in one position to complete circuits through both of said windings, and means for automatically moving said movable member from said position to a position in which circuit through the main winding only is completed.

2. The combination with two windings of a dynamo-electric machine, of a switch having a movable member adapted in one position to complete circuits through both of said windings, and means independent in its operation of the electrical condition of said windings for automatically moving said movable member from said position to a position in which circuit is completed through one only of said windings.

3. The combination with two circuits, of a switch having a movable member adapted, in one position, to complete both of said circuits, and means independent in its operation of the electrical condition of said circuits for automatically moving said movable member from said position to a position in which one only of said circuits is completed.

4. The combination with two circuits, of a switch having a member manually movable into one position to complete both of said circuits, and means for automatically moving said member from said position to another position in which only one of said circuits is completed.

5. The combination of a plurality of circuits and a switch having a movable member adapted in one position to close said circuits, and automatic means independent in its operation of the electrical condition of said circuits for moving said movable member from said position to a position in which certain only of said circuits are closed.

6. The combination with the main and starting windings of an induction-motor, of a manually-operated switch having a movable member adapted to be moved to a position in which circuits through both of said windings are completed, and automatic means for moving said movable member into a position where circuit through said main winding only is completed, when said movable member is released from said position in which circuits are made through both of said coils.

7. The combination with main and starting windings of an induction-motor, of a switch having a movable member adapted in one position to open the circuits through said windings, in another position to close circuits through said windings, and automatic means for moving said movable member from said position in which circuits are made through said windings to a position in which circuit is made through said main winding only.

8. The combination of the main and starting windings of an induction-motor and a switch having its "running" position between the "starting" and "off" positions, means for moving said switch from the off to the starting position, and automatic means for moving said controller from said starting position to said running position.

9. A switch having an "off" position, a "starting" position, and a "running" position located between said off and starting positions.

10. The combination of the movable member of a switch having a "running" position located between "starting" and "off" positions, and automatic means for moving said movable member from said starting to said running position.

11. The combination of a cam operatively connected to the movable member of a switch, and means acting upon said cam tending to move said movable member from one operative position to another.

12. The combination of a cam operatively connected to the movable member of a controller, and a spring-pressed member, acting upon said cam, tending to move said movable member from one operative position to another.

13. The combination with a rotary member, of a cam therefor having one face comprising a notch and a surface adjacent to said notch, and separated therefrom by a projection, the elements of which surface are at progressively-greater distances from the center about which said rotary member turns as said notch is receded from, another face being an arc described about said center, a member spring-pressed toward said center adapted to engage with the first-mentioned face, a second member engaging with the other face and spring-pressed toward said center in opposition to the first-mentioned spring-pressed member.

14. The combination with a switch, of a rotary member, a cam therefor having a face comprising a notch and a surface adjacent to said notch and separated therefrom by a projection, the elements of said surface being of progressively-greater distances from the center about which said rotary member turns, and a spring-pressed member adapted to engage said cam-face.

15. As an article of manufacture, a cam adapted to turn about a center, having one face comprising a notch, and a surface adjacent to said notch and separated therefrom by a projection, the elements of said surface being at progressively-greater distances from said center as said notch is receded from, and a second face which is an arc described about said center and diametrically opposite the first-mentioned face.

16. The combination of a cam, members bearing against diametrically opposite points of said cam, and a spring extending to diametrically opposite points of said cam and acting to press said members against said cam and supported at a point between said members.

17. The combination of a cam, members bearing against diametrically opposite points of said cam, a band-spring encircling said cam and acting to press said members against said cam, and a support for said spring.

In witness whereof I have hereunto set my hand this 19th day of May, 1902.

AUGUSTINE R. EVEREST.

Witnesses:
DUGALD McK. McKILLOP,
ALEX. F. MACDONALD.